US012737703B2

(12) United States Patent
Liu et al.

(10) Patent No.: US 12,737,703 B2
(45) Date of Patent: Sep. 15, 2026

(54) PREDICTING WORK EFFORT FOR PORTING SOFTWARE PROJECTS ACROSS DISPARATE PLATFORMS

(71) Applicant: International Business Machines Corporation, Armonk, NY (US)

(72) Inventors: Jiang Yi Liu, Beijing (CN); Wen Ji Huang, Beijing (CN); Yong Qing Xu, Beijing (CN); Sheng Shuang Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 18/660,404

(22) Filed: May 10, 2024

(65) Prior Publication Data

US 2025/0348810 A1 Nov. 13, 2025

(51) Int. Cl.

*G06Q 10/06* (2023.01)
*G06F 8/76* (2018.01)
*G06Q 10/0631* (2023.01)

(52) U.S. Cl.

CPC ......... *G06Q 10/06315* (2013.01); *G06F 8/76* (2013.01)

(58) Field of Classification Search

CPC ........................................................ G06Q 10/06
See application file for complete search history.

(56) References Cited

U.S. PATENT DOCUMENTS 5,815,638 A 9/1998 Lenz et al.
8,375,364 B2 2/2013 Udupa et al.
9,459,862 B2 * 10/2016 Araya ..................... G06F 8/427
9,977,673 B1 * 5/2018 Friedkin ................... G06F 8/76
11,907,711 B2 2/2024 Jia et al.
2004/0111712 A1 * 6/2004 Humpert ................... G06F 8/51 717/136
2004/0205732 A1 * 10/2004 Parkinson ............. G06F 40/154 717/136
2007/0192364 A1 * 8/2007 Zhang .................... G06Q 10/10
2008/0127180 A1 * 5/2008 Glogowski ............... G06F 8/61 717/177
2012/0265493 A1 * 10/2012 Greco .................. G06F 30/392 703/1
2014/0215446 A1 * 7/2014 Araya ..................... G06F 8/456 717/137
2014/0282456 A1 9/2014 Drost et al.

(Continued)

FOREIGN PATENT DOCUMENTS

JP 6287549 B 3/2018

OTHER PUBLICATIONS

Anonymous, "System and Method for Intelligent Estimates for Transforming Applications for Cloud," ip.com, Jul. 28, 2022, 7 pages, ip.com, accessed Apr. 1, 2024, https://priorart.ip.com/IPCOM/000270680.

*Primary Examiner* — Nga B Nguyen
(74) *Attorney, Agent, or Firm* — Yee & Associates, P.C.

(57) ABSTRACT

Predicting porting work effort is provided. A total porting work effort to port a software project from a source platform to a disparate target platform is predicted using a first porting work effort, a second porting work effort, and a third porting work effort. The software project is ported from the source platform to the disparate target platform based on the total porting work effort being less than a defined maximum porting work effort threshold level.

16 Claims, 12 Drawing Sheets

(56) References Cited

U.S. PATENT DOCUMENTS

| | | | | |
|---|---|---|---|---|
| 2016/0110233 | A1* | 4/2016 | Clissold | G06F 9/541<br>719/320 |
| 2021/0056007 | A1* | 2/2021 | Viswanathan | G06F 11/3688 |
| 2021/0406005 | A1 | 12/2021 | Sturtevant et al. | |
| 2022/0229957 | A1 | 7/2022 | Venugopal et al. | |
| 2022/0244930 | A1* | 8/2022 | Lei | G06F 8/51 |
| 2024/0184564 | A1* | 6/2024 | Gabel | G06F 8/70 |
| 2025/0284622 | A1* | 9/2025 | Körner | G06F 11/3692 |

* cited by examiner

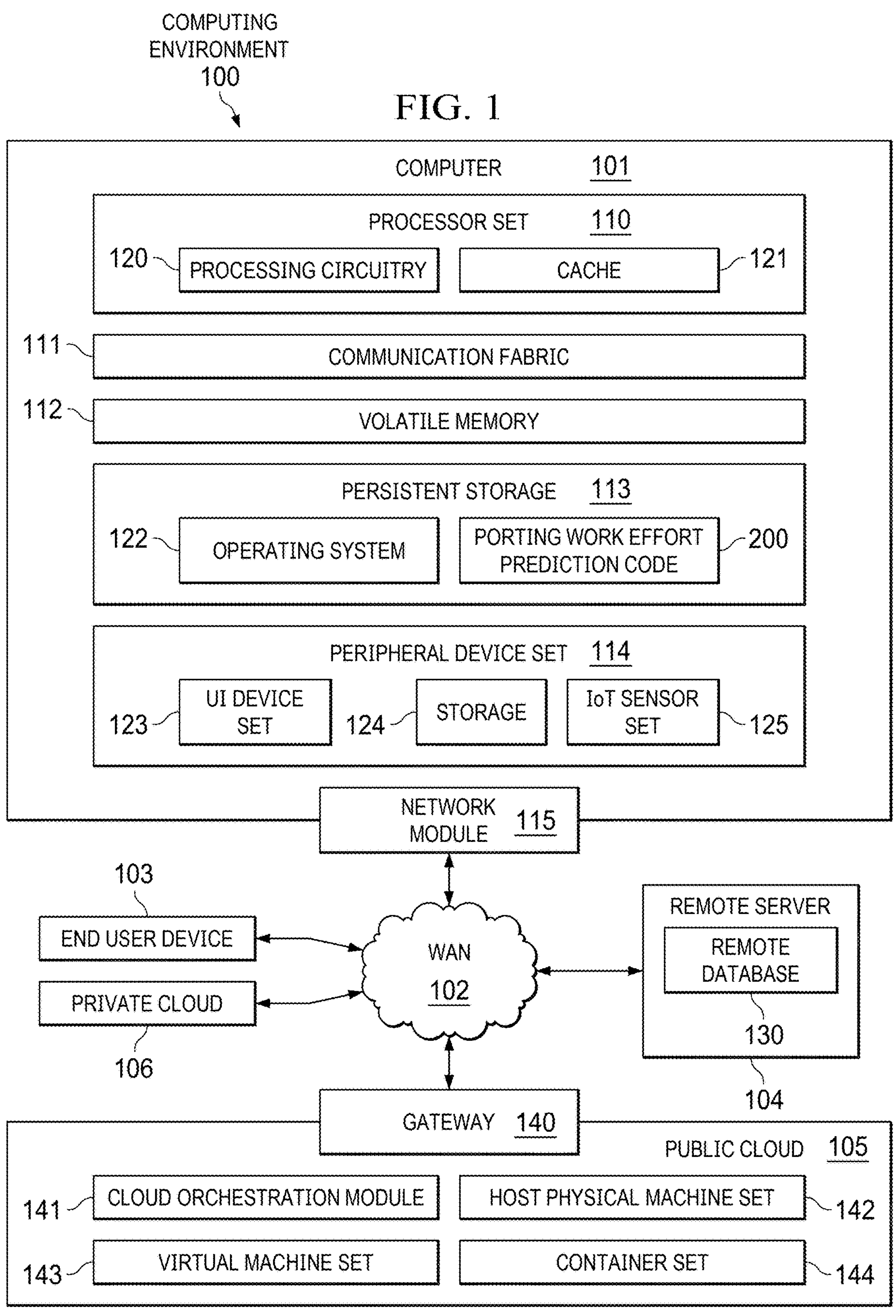
COMPUTING ENVIRONMENT
100
FIG. 1
COMPUTER 101
PROCESSOR SET 110
120
PROCESSING CIRCUITRY
CACHE
121
111
COMMUNICATION FABRIC
112
VOLATILE MEMORY
PERSISTENT STORAGE 113
122
OPERATING SYSTEM
PORTING WORK EFFORT PREDICTION CODE
200
PERIPHERAL DEVICE SET 114
123
UI DEVICE SET
124
STORAGE
IoT SENSOR SET
125
NETWORK MODULE 115
103
END USER DEVICE
PRIVATE CLOUD
106
WAN
102
REMOTE SERVER
REMOTE DATABASE
130
104
GATEWAY 140
PUBLIC CLOUD 105
141
CLOUD ORCHESTRATION MODULE
HOST PHYSICAL MACHINE SET
142
143
VIRTUAL MACHINE SET
CONTAINER SET
144

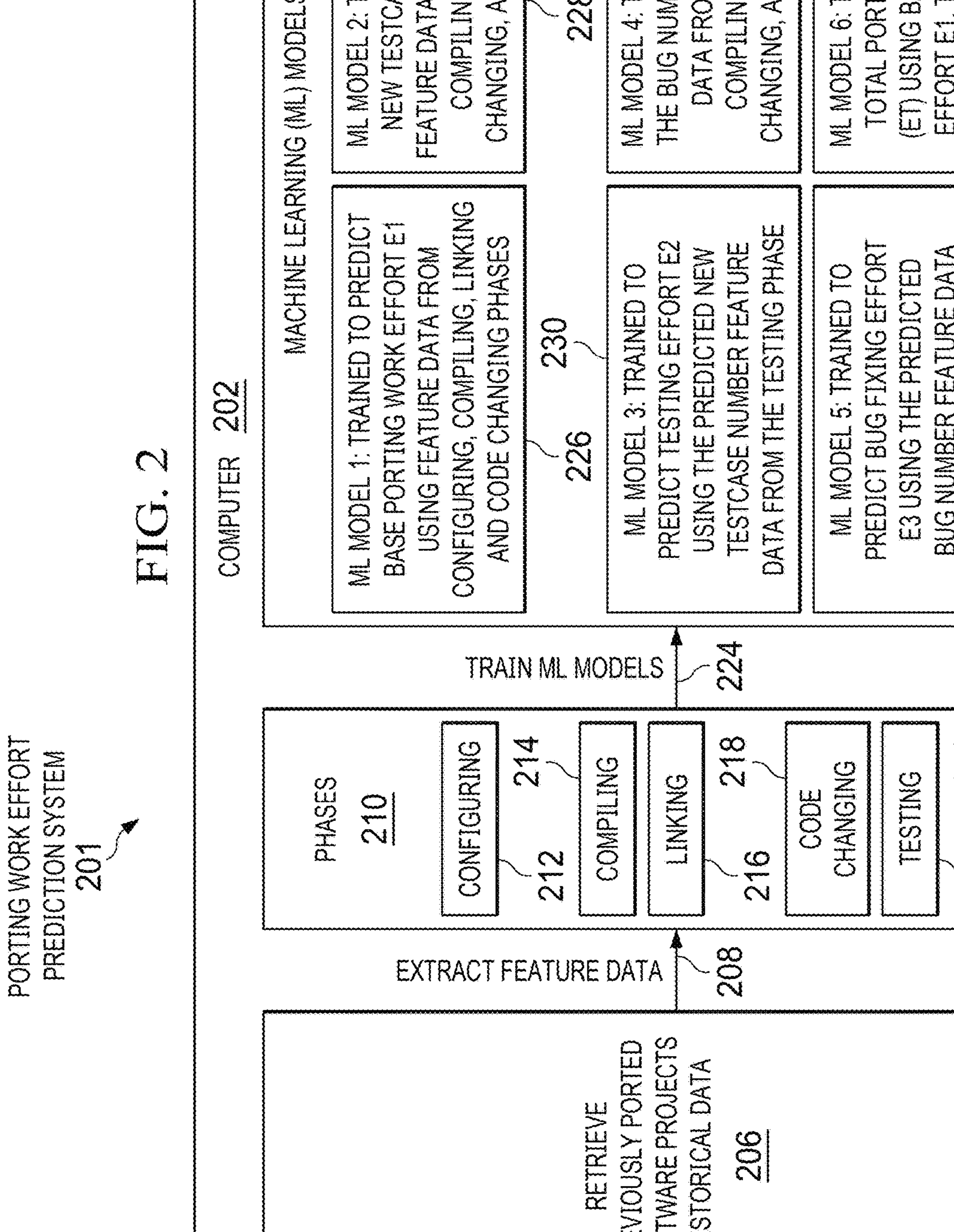
FIG. 2
PORTING WORK EFFORT PREDICTION SYSTEM
201
COMPUTER 202
RETRIEVE PREVIOUSLY PORTED SOFTWARE PROJECTS HISTORICAL DATA
206
EXTRACT FEATURE DATA
208
PHASES
210
CONFIGURING
212
COMPILING
214
LINKING
216
CODE CHANGING
218
TESTING
220
BUG FIXING
222
TRAIN ML MODELS
224
MACHINE LEARNING (ML) MODELS 204
ML MODEL 1: TRAINED TO PREDICT BASE PORTING WORK EFFORT E1 USING FEATURE DATA FROM CONFIGURING, COMPILING, LINKING AND CODE CHANGING PHASES
226
ML MODEL 2: TRAINED TO PREDICT NEW TESTCASE NUMBER USING FEATURE DATA FROM CONFIGURING, COMPILING, LINKING, CODE CHANGING, AND TESTING PHASES
228
ML MODEL 3: TRAINED TO PREDICT TESTING EFFORT E2 USING THE PREDICTED NEW TESTCASE NUMBER FEATURE DATA FROM THE TESTING PHASE
230
ML MODEL 4: TRAINED TO PREDICT THE BUG NUMBER USING FEATURE DATA FROM CONFIGURING, COMPILING, LINKING, CODE CHANGING, AND TESTING PHASES
232
ML MODEL 5: TRAINED TO PREDICT BUG FIXING EFFORT E3 USING THE PREDICTED BUG NUMBER FEATURE DATA FROM THE BUG FIXING PHASE
234
ML MODEL 6: TRAINED TO PREDICT TOTAL PORTING WORK EFFORT (ET) USING BASE PORTING WORK EFFORT E1, TESTING EFFORT E2, AND BUG FIXING EFFORT E3
236

PORTING WORK EFFORT PREDICTION TABLE 500

| PHASES 210 | FEATURE DATA 504 | FEATURE DATA INDEX 506 | PORTING WORK EFFORT ID 508 | EXAMPLE PORTING WORK EFFORT NUMBER 510 |
|---|---|---|---|---|
| 212 CONFIGURING | 512 CONFIGURE CODE (LOC) | x1 | $e_1$ | 55 |
| 214 COMPILING | 514 COMPILE COMMANDS (LOC) | x2 | $e_2$ | 55 |
| 216 LINKING | 516 LINKAGE COMMANDS (LOC) | x3 | $e_3$ | 55 |
| 218 CODE CHANGING | 518 SOURCE CODE (LOC) | x4 | $e_4$ | 55 |
| 220 TESTING | 520 ORIGINAL TESTCASE NUMBER | x5 | $e_5$ | 55 |
| | 522 NEW TESTCASE NUMBER | x6 | | |
| 222 BUG FIXING | 524 BUG NUMBER | x7 | $e_6$ | 55 |

FIG. 5

| PHASES | FEATURE DATA | FEATURE DATA INDEX | PORTING WORK EFFORT ID | EXAMPLE PORTING WORK EFFORT NUMBER |
|---|---|---|---|---|
| CONFIGURING | CONFIGURE CODE (LOC) | x1 | $e_1$ | 55 |
| COMPILING | COMPILE COMMANDS (LOC) | x2 | $e_2$ | 55 |
| LINKING | LINKAGE COMMANDS (LOC) | x3 | $e_3$ | 55 |
| CODE CHANGING | SOURCE CODE (LOC) | x4 | $e_4$ | 55 |

TOTAL PORTING WORK EFFORT PREDICTION PROCESS
900

| PHASES | FEATURE DATA INDEX | PREDICTED FEATURE DATA INDEX | PREDICTED PORTING WORK EFFORTS | PREDICTED TOTAL PORTING WORK EFFORT |
|---|---|---|---|---|
| CONFIGURING | x1 | | $E_1$ 904 | $E_T$ 912 |
| COMPILING | x2 | | | |
| LINKING | x3 | | | |
| CODE CHANGING | x4 | | | |
| TESTING | x5 | x6 | $E_2$ (906) | |
| BUG FIXING | | x7 | $E_3$ (908) | |

1002 RECEIVE, BY A COMPUTER, A REQUEST TO PORT A SOFTWARE PROJECT FROM A SOURCE PLATFORM TO A DISPARATE TARGET PLATFORM

1004 RETRIEVE, BY THE COMPUTER, A SET OF HISTORICAL DATA CORRESPONDING TO SIMILAR SOFTWARE PROJECTS PREVIOUSLY PORTED TO SIMILAR TARGET PLATFORMS FROM A DATABASE

1006 PERFORM, BY THE COMPUTER, AN ANALYSIS OF THE SET OF HISTORICAL DATA CORRESPONDING TO THE SIMILAR SOFTWARE PROJECTS PREVIOUSLY PORTED TO THE SIMILAR TARGET PLATFORMS

1008 EXTRACT, BY THE COMPUTER, FEATURE DATA FOR EACH RESPECTIVE PHASE OF A PLURALITY OF PHASES ASSOCIATED WITH A SOFTWARE PROJECT PORTING PROCESS FROM THE SET OF HISTORICAL DATA BASED ON THE ANALYSIS OF THE SET OF HISTORICAL DATA CORRESPONDING TO THE SIMILAR SOFTWARE PROJECTS PREVIOUSLY PORTED TO THE SIMILAR TARGET PLATFORMS, THE PLURALITY OF PHASES INCLUDES A CONFIGURING PHASE, A COMPILING PHASE, A LINKING PHASE, A CODE CHANGING PHASE, A TESTING PHASE, AND A BUG FIXING PHASE

1010 TRAIN, BY THE COMPUTER, A FIRST MACHINE LEARNING MODEL TO PREDICT A FIRST PORTING WORK EFFORT (E1) USING THE FEATURE DATA CORRESPONDING TO THE CONFIGURING PHASE, THE COMPILING PHASE, THE LINKING PHASE, AND THE CODE CHANGING PHASE

1012 TRAIN, BY THE COMPUTER, A SECOND MACHINE LEARNING MODEL TO PREDICT A NUMBER OF NEW TESTCASES NEEDED USING THE FEATURE DATA CORRESPONDING TO THE CONFIGURING PHASE, THE COMPILING PHASE, THE LINKING PHASE, THE CODE CHANGING PHASE, AND THE BUG TESTING PHASE THAT INCLUDES A NUMBER OF ORIGINAL TESTCASES USED WHILE BUILDING THE SOFTWARE PROJECT ORIGINALLY

1014 TRAIN, BY THE COMPUTER, A THIRD MACHINE LEARNING MODEL TO PREDICT A SECOND PORTING WORK EFFORT (E2) USING THE PREDICTED NUMBER OF NEW TESTCASES NEEDED THAT IS INCLUDED IN THE FEATURE DATA CORRESPONDING TO THE TESTING PHASE

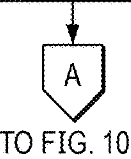

TO FIG. 10B

1016 TRAIN, BY THE COMPUTER, A FOURTH MACHINE LEARNING MODEL TO PREDICT A NUMBER OF BUGS DETECTED WHILE RUNNING THE NUMBER OF ORIGINAL TESTCASES AND THE PREDICTED NUMBER OF NEW TESTCASES NEEDED USING THE FEATURE DATA CORRESPONDING TO THE CONFIGURING PHASE, THE COMPILING PHASE, THE LINKING PHASE, THE CODE CHANGING PHASE, AND THE TESTING PHASE

1018 TRAIN, BY THE COMPUTER, A FIFTH MACHINE LEARNING MODEL TO PREDICT A THIRD PORTING WORK EFFORT (E3) USING THE PREDICTED NUMBER OF BUGS DETECTED THAT IS INCLUDED IN THE FEATURE DATA CORRESPONDING TO THE BUG FIXING PHASE

1020 TRAIN, BY THE COMPUTER, A SIXTH MACHINE LEARNING MODEL TO PREDICT A TOTAL PORTING WORK EFFORT (ET) USING THE FIRST PORTING WORK EFFORT (E1), THE SECOND PORTING WORK EFFORT (E2), AND THE THIRD PORTING WORK EFFORT (E3)

1022 UTILIZE, BY THE COMPUTER, THE FIRST MACHINE LEARNING MODEL TO PREDICT THE FIRST PORTING WORK EFFORT (E1) USING THE FEATURE DATA CORRESPONDING TO THE CONFIGURING PHASE, THE COMPILING PHASE, THE LINKING PHASE, AND THE CODE CHANGING PHASE

1024 UTILIZE, BY THE COMPUTER, THE SECOND MACHINE LEARNING MODEL TO PREDICT THE NUMBER OF NEW TESTCASES NEEDED USING THE FEATURE DATA CORRESPONDING TO THE CONFIGURING PHASE, THE COMPILING PHASE, THE LINKING PHASE, THE CODE CHANGING PHASE, AND THE TESTING PHASE THAT INCLUDES THE NUMBER OF ORIGINAL TESTCASES USED WHILE BUILDING THE SOFTWARE PROJECT ORIGINALLY

1026 UTILIZE, BY THE COMPUTER, THE THIRD MACHINE LEARNING MODEL TO PREDICT THE SECOND PORTING WORK EFFORT (E2) USING THE PREDICTED NUMBER OF NEW TESTCASES NEEDED THAT IS INCLUDED IN THE FEATURE DATA CORRESPONDING TO THE TESTING PHASE

FIG. 10B

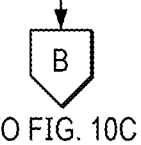

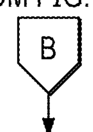

1028 UTILIZE, BY THE COMPUTER, THE FOURTH MACHINE LEARNING MODEL TO PREDICT THE NUMBER OF BUGS DETECTED WHILE RUNNING THE NUMBER OF ORIGINAL TESTCASES AND THE PREDICTED NUMBER OF NEW TESTCASES NEEDED USING THE FEATURE DATA CORRESPONDING TO THE CONFIGURING PHASE, THE COMPILING PHASE, THE LINKING PHASE, THE CODE CHANGING PHASE, AND THE TESTING PHASE

1030 UTILIZE, BY THE COMPUTER, THE FIFTH MACHINE LEARNING MODEL TO PREDICT THE THIRD PORTING WORK EFFORT (E3) USING THE PREDICTED NUMBER OF BUGS DETECTED THAT IS INCLUDED IN THE FEATURE DATA CORRESPONDING TO THE BUG FIXING PHASE

1032 UTILIZE, BY THE COMPUTER, THE SIXTH MACHINE LEARNING MODEL TO PREDICT THE TOTAL PORTING WORK EFFORT (ET) NEEDED TO PORT THE SOFTWARE PROJECT FROM THE SOURCE PLATFORM TO THE DISPARATE TARGET PLATFORM USING THE FIRST PORTING WORK EFFORT (E1), THE SECOND PORTING WORK EFFORT (E2), AND THE THIRD PORTING WORK EFFORT (E3), THE FIRST PORTING WORK EFFORT (E1) IS A BASE PORTING WORK EFFORT, THE SECOND PORTING WORK EFFORT (E2) IS A TESTING EFFORT, AND THE THIRD PORTING WORK EFFORT (E3) IS A BUG FIXING EFFORT

1034 PORT, BY THE COMPUTER, THE SOFTWARE PROJECT FROM THE SOURCE PLATFORM TO THE DISPARATE TARGET PLATFORM BASED ON THE TOTAL PORTING WORK EFFORT BEING LESS THAN A DEFINED MAXIMUM PORTING WORK EFFORT THRESHOLD LEVEL

END

FIG. 10C

PREDICTING WORK EFFORT FOR PORTING SOFTWARE PROJECTS ACROSS DISPARATE PLATFORMS

BACKGROUND

The disclosure relates generally to software projects and more specifically to porting software projects.

A software project is the complete procedure of software development from requirement gathering to testing and maintenance. Porting is the process of adapting a software project for the purpose of achieving some form of execution in a platform (e.g., computing environment) that is different from the platform that the software project was originally designed for (e.g., different operating system, third party libraries, processor, and the like). A software project is portable when the work effort of porting the software project to a new platform is less than the work effort of building the software project from scratch.

SUMMARY

According to one illustrative embodiment, a computer-implemented method for predicting porting work effort is provided. A computer, utilizing a sixth machine learning model, predicts a total porting work effort to port a software project from a source platform to a disparate target platform using a first porting work effort, a second porting work effort, and a third porting work effort. The computer ports the software project from the source platform to the disparate target platform based on the total porting work effort being less than a defined maximum porting work effort threshold level. According to other illustrative embodiments, a computer system and computer program product for predicting porting work effort are provided.

BRIEF DESCRIPTION OF THE DRAWINGS

FIG. 1 is a pictorial representation of a computing environment in which illustrative embodiments may be implemented;

FIG. 2 is a diagram illustrating an example of a porting work effort prediction system in accordance with an illustrative embodiment;

FIG. 5 is a diagram illustrating an example of a porting work effort prediction table in accordance with an illustrative embodiment;

FIGS. 10A-10C are a flowchart illustrating a process for predicting porting work effort in accordance with an illustrative embodiment.

DETAILED DESCRIPTION

Figure 3:
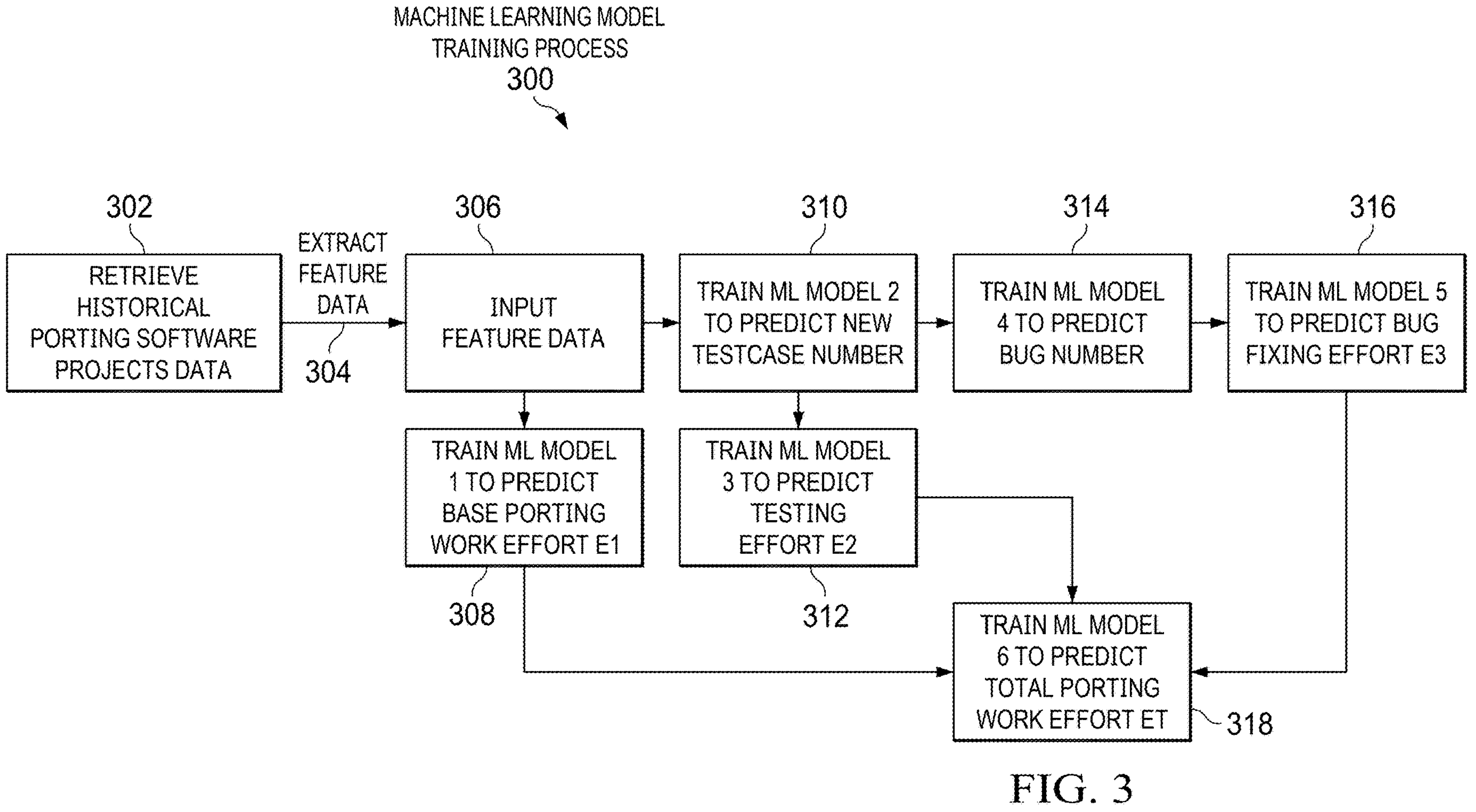
FIG. 3 is a diagram illustrating an example of a machine learning training process in accordance with an illustrative embodiment.

A computer-implemented method provides predicting porting work effort. A computer, utilizing a sixth machine learning model, predicts a total porting work effort to port a software project from a source platform to a disparate target platform using a first porting work effort, a second porting work effort, and a third porting work effort. The computer ports the software project from the source platform to the disparate target platform based on the total porting work effort being less than a defined maximum porting work effort threshold level. As a result, illustrative embodiments provide a technical effect of accurately predicting the total work effort needed for porting a software project from a source platform to a disparate target platform based on three different porting work efforts using a plurality of machine learning models.

Also, the computer, utilizing a first machine learning model, predicts the first porting work effort using feature data corresponding to a configuring phase, a compiling phase, a linking phase, and a code changing phase. As a result, illustrative embodiments provide a technical effect of using a first machine learning model to predict first porting work effort based on feature data corresponding to several different phases associated with a software project porting process.

In addition, the computer, utilizing a second machine learning model, predicts a number of new testcases using feature data corresponding to a configuring phase, a compiling phase, a linking phase, a code changing phase, and a testing phase that includes a number of original testcases used while building the software project. The computer, utilizing a third machine learning model, predicts the second porting work effort using a predicted number of new testcases that is included in feature data corresponding to the testing phase. As a result, illustrative embodiments provide a technical effect of using a second machine learning model to predict a number of new testcases needed based on feature data corresponding to several different phases associated with a software project porting process that includes a testing phase, which indicates a number of original testcases used while building a particular software project, and using a third machine learning model to predict a second porting work effort based on the predicted number of new testcases.

Further, the computer, utilizing a fourth machine learning model, predicts a number of bugs detected while running a number of original testcases and a predicted number of new testcases using feature data corresponding to a configuring phase, a compiling phase, a linking phase, a code changing phase, and a testing phase. The computer, utilizing a fifth machine learning model, predicts the third porting work effort using a predicted number of bugs detected that is included in feature data corresponding to a bug fixing phase. As a result, illustrative embodiments provide a technical effect of using a fourth machine learning model to predict a number of bugs detected while running the number of original testcases and the predicted number of new testcases based on feature data corresponding to a plurality of different phases associated with a software project porting process and using a fifth machine learning model to predict a third porting work effort based on the predicted number of bugs detected.

Furthermore, the first porting work effort is a base porting work effort, the second porting work effort is a testing effort, and the third porting work effort is a bug fixing effort. As a result, illustrative embodiments provide a technical effect of identifying three different porting work efforts, which include a base porting work effort, a testing effort, and a bug fixing effort, to accurately predict the total work effort needed for porting a software project from a source platform to a disparate target platform and increase software project security during the porting process between disparate platforms by detecting and fixing bugs that can cause vulnerabilities.

Moreover, the computer receives a request to port the software project from the source platform to the disparate target platform. The computer retrieves a set of historical data corresponding to similar software projects previously ported to similar target platforms in response to the request. The computer performs an analysis of the set of historical data corresponding to the similar software projects previously ported to the similar target platforms. The computer extracts feature data for each respective phase of a plurality of phases associated with a software project porting process from the set of historical data based on the analysis of the set of historical data corresponding to the similar software projects previously ported to the similar target platforms. The plurality of phases includes a configuring phase, a compiling phase, a linking phase, a code changing phase, a testing phase, and a bug fixing phase. As a result, illustrative embodiments provide a technical effect of extracting feature data for each respective phase of a plurality of phases, which includes a configuring phase, a compiling phase, a linking phase, a code changing phase, a testing phase, and a bug fixing phase, associated with a software project porting process from a set of historical data corresponding to similar software projects previously ported to similar target platforms based on analysis of the set of historical data.

The computer trains a first machine learning model to predict the first porting work effort using the feature data corresponding to the configuring phase, the compiling phase, the linking phase, and the code changing phase. As a result, illustrative embodiments provide a technical effect of training a first machine learning model to predict a first porting work effort using feature data corresponding to a plurality of different phases associated with a software project porting process.

The computer also trains a second machine learning model to predict a number of new testcases using the feature data corresponding to the configuring phase, the compiling phase, the linking phase, the code changing phase, and the testing phase that includes a number of original testcases used while building the software project. The computer trains a third machine learning model to predict the second porting work effort using the number of new testcases that is included in the feature data corresponding to the testing phase. As a result, illustrative embodiments provide a technical effect of training a second machine learning model to predict a number of new testcases using feature data corresponding to a plurality of different phases associated with a software project porting process that includes a testing phase, which indicates a number of original testcases used while building a particular software project, and training a third machine learning model to predict a second porting work effort using the number of new testcases.

In addition, the computer trains a fourth machine learning model to predict a number of bugs detected while running a number of original testcases and a predicted number of new testcases using the feature data corresponding to the configuring phase, the compiling phase, the linking phase, the code changing phase, and the testing phase. The computer trains a fifth machine learning model to predict the third porting work effort using the number of bugs detected that is included in the feature data corresponding to the bug fixing phase. As a result, illustrative embodiments provide a technical effect of training a fourth machine learning model to predict a number of bugs detected while running the number of original testcases and the predicted number of new testcases using feature data corresponding to a configuring phase, a compiling phase, a linking phase, a code changing phase, and a testing phase associated with a software project porting process and training a fifth machine learning model to predict a third porting work effort using the number of bugs detected.

Further, the computer trains the sixth machine learning model to predict the total porting work effort using the first porting work effort, the second porting work effort, and the third porting work effort. As a result, illustrative embodiments provide a technical effect of training a sixth machine learning model to accurately predict a total porting work effort using three different porting work efforts.

A computer system for predicting porting work effort comprises a communication fabric, a set of computer-readable storage media connected to the communication fabric, where the set of computer-readable storage media collectively stores program instructions, and a set of processors connected to the communication fabric, where the set of processors executes the program instructions. The computer system, utilizing a sixth machine learning model, predicts a total porting work effort to port a software project from a source platform to a disparate target platform using a first porting work effort, a second porting work effort, and a third porting work effort. The computer system ports the software project from the source platform to the disparate target platform based on the total porting work effort being less than a defined maximum porting work effort threshold level. As a result, illustrative embodiments provide a technical effect of accurately predicting the total work effort needed for porting a software project from a source platform to a disparate target platform based on three different porting work efforts using a plurality of machine learning models.

Also, the computer system, utilizing a first machine learning model, predicts the first porting work effort using feature data corresponding to a configuring phase, a compiling phase, a linking phase, and a code changing phase. As a result, illustrative embodiments provide a technical effect of using a first machine learning model to predict first porting work effort based on feature data corresponding to several different phases associated with a software project porting process.

In addition, the computer system, utilizing a second machine learning model, predicts a number of new testcases using feature data corresponding to a configuring phase, a compiling phase, a linking phase, a code changing phase, and a testing phase that includes a number of original testcases used while building the software project. The computer system, utilizing a third machine learning model, predicts the second porting work effort using a predicted number of new testcases that is included in feature data corresponding to the testing phase. As a result, illustrative embodiments provide a technical effect of using a second machine learning model to predict a number of new testcases needed based on feature data corresponding to several different phases associated with a software project porting process that includes a testing phase, which indicates a number of original testcases used while building a particular software project, and using a third machine learning model to predict the second porting work effort based on the predicted number of new testcases.

Further, the computer system, utilizing a fourth machine learning model, predicts a number of bugs detected while running a number of original testcases and a predicted number of new testcases using feature data corresponding to a configuring phase, a compiling phase, a linking phase, a code changing phase, and a testing phase. The computer system, utilizing a fifth machine learning model, predicts the third porting work effort using a predicted number of bugs detected that is included in feature data corresponding to a bug fixing phase. As a result, illustrative embodiments provide a technical effect of using a fourth machine learning model to predict a number of bugs detected while running the number of original testcases and the predicted number of new testcases based on feature data corresponding to a plurality of different phases associated with a software project porting process and using a fifth machine learning model to predict a third porting work effort based on the predicted number of bugs detected.

Furthermore, the first porting work effort is a base porting work effort, the second porting work effort is a testing effort, and the third porting work effort is a bug fixing effort. As a result, illustrative embodiments provide a technical effect of identifying three different porting work efforts, which include a base porting work effort, a testing effort, and a bug fixing effort, to accurately predict the total work effort needed for porting a software project from a source platform to a disparate target platform and increase software project security during the porting process between disparate platforms by detecting and fixing bugs that can cause vulnerabilities.

A computer program product for predicting porting work effort comprises a set of computer-readable storage media having program instructions collectively stored therein, the program instructions executable by a computer. The computer, utilizing a sixth machine learning model, predicts a total porting work effort to port a software project from a source platform to a disparate target platform using a first porting work effort, a second porting work effort, and a third porting work effort. The computer ports the software project from the source platform to the disparate target platform based on the total porting work effort being less than a defined maximum porting work effort threshold level. As a result, illustrative embodiments provide a technical effect of accurately predicting the total work effort needed for porting a software project from a source platform to a disparate target platform based on three different porting work efforts using a plurality of machine learning models.

Also, the computer, utilizing a first machine learning model, predicts the first porting work effort using feature data corresponding to a configuring phase, a compiling phase, a linking phase, and a code changing phase. As a result, illustrative embodiments provide a technical effect of using a first machine learning model to predict first porting work effort based on feature data corresponding to several different phases associated with a software project porting process.

In addition, the computer, utilizing a second machine learning model, predicts a number of new testcases using feature data corresponding to a configuring phase, a compiling phase, a linking phase, a code changing phase, and a testing phase that includes a number of original testcases used while building the software project. The computer, utilizing a third machine learning model, predicts the second porting work effort using a predicted number of new testcases that is included in feature data corresponding to the testing phase. As a result, illustrative embodiments provide a technical effect of using a second machine learning model to predict a number of new testcases needed based on feature data corresponding to several different phases associated with a software project porting process that includes a testing phase, which indicates a number of original testcases used while building a particular software project, and using a third machine learning model to predict the second porting work effort based on the predicted number of new testcases.

Further, the computer, utilizing a fourth machine learning model, predicts a number of bugs detected while running a number of original testcases and a predicted number of new testcases using feature data corresponding to a configuring phase, a compiling phase, a linking phase, a code changing phase, and a testing phase. The computer, utilizing a fifth machine learning model, predicts the third porting work effort using a predicted number of bugs detected that is included in feature data corresponding to a bug fixing phase. As a result, illustrative embodiments provide a technical effect of using a fourth machine learning model to predict a number of bugs detected while running the number of original testcases and the predicted number of new testcases based on feature data corresponding to a plurality of different phases associated with a software project porting process and using a fifth machine learning model to predict the third porting work effort based on the predicted number of bugs detected.

Furthermore, the first porting work effort is a base porting work effort, the second porting work effort is a testing effort, and the third porting work effort is a bug fixing effort. As a result, illustrative embodiments provide a technical effect of identifying three different porting work efforts, which include a base porting work effort, a testing effort, and a bug fixing effort, to accurately predict the total work effort needed for porting a software project from a source platform to a disparate target platform and increase software project security during the porting process between disparate platforms by detecting and fixing bugs that can cause vulnerabilities.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as porting work effort prediction code 200. For example, porting work effort prediction code 200 predicts the total amount of work effort needed to port a software project from a source platform to a disparate target platform utilizing a plurality of trained machine learning models. Porting work effort prediction code 200 extracts a feature or metric for each of a plurality of phases associated with porting the software project from historical data corresponding to previously ported software projects. The plurality of phases include, for example, a configuration phase, a compilation phase, a linkage phase, a code change phase, a testing phase, a bug fixing phase, and the like.

Porting work effort prediction code 200 utilizes different machine learning models for different phases of the software project porting process to determine a plurality of prediction functions. Porting work effort prediction code 200 utilizes a first prediction function of a first machine learning model to predict base porting work effort (E1) using feature data corresponding to the configuration, compilation, linking, and code change phases. Porting work effort prediction code 200 utilizes a second prediction function of a second machine learning model to predict a number of new testcases needed using feature data corresponding to the configuration, compilation, linkage, and code change phases, and the original number of testcases used while building the software project originally. Porting work effort prediction code 200 utilizes a third prediction function of a third machine learning model to predict test effort (E2) using the original number of testcases used and the predicted number of new testcases needed.

Porting work effort prediction code 200 utilizes a fourth prediction function of a fourth machine learning model to predict a number of bugs detected while running the testcases using feature data corresponding to the configuration, compilation, linkage, and code change phases, and the original number of testcases used and the predicted number of new testcases needed. Porting work effort prediction code 200 utilizes a fifth prediction function of a fifth machine learning model to predict bug fix effort (E3) using the predicted number of detected bugs. Porting work effort prediction code 200 utilizes a sixth prediction function of a sixth machine learning model to predict the total porting work effort (ET) for porting the software project across disparate platforms using base porting work effort (E1), test effort (E2), and bug fix effort (E3).

As a result, porting work effort prediction code 200 can accurately predict the total work effort needed for porting a software project from a source platform to a disparate target platform using a plurality of machine learning models. In addition, porting work effort prediction code 200 can increase software project security during the porting process between disparate platforms by detecting and fixing bugs that can cause vulnerabilities.

In addition to porting work effort prediction code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and porting work effort prediction code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in porting work effort prediction code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a program developer who utilizes the software project porting work effort prediction services provided by computer 101), and may take any of the forms discussed above in connection with computer 101. EUD 103 typically receives helpful and useful data from the operations of computer 101. For example, in a hypothetical case where computer 101 is designed to provide a software project porting work effort prediction to the end user, this recommendation would typically be communicated from network module 115 of computer 101 through WAN 102 to EUD 103. In this way, EUD 103 can display, or otherwise present, the software project porting work effort prediction to the end user. In some embodiments, EUD 103 may be a client device, such as thin client, heavy client, mainframe computer, desktop computer, laptop computer, tablet computer, smart phone, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a software project porting work effort prediction based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Increasingly, open-source software is emerging in a multitude of different types of platforms to support cloud development, especially with regard to supporting containers. Porting open-source software between platforms is one way to build a robust ecosystem. When porting a new software project to a different type of platform, it is difficult to determine the amount of porting work effort needed due to the difference between the two disparate or heterogeneous platforms.

As a result, it is challenging for software development teams to accurately determine appropriate porting work efforts. However, the work effort used to develop a software project originally can be utilized as a starting reference point, but the work effort used to develop the software project originally is only partially accurate because the software porting process is different from the software development process due to the increased complexity associated with porting the software project across disparate platforms.

Currently, solutions exist that can evaluate and determine software project development cost. However, these current solutions for determining software project development cost are not capable of accurately determining the work effort needed for porting large scale software projects across disparate platforms because these current solutions do not take into account factors, such as, for example, the different phases associated with porting a software project, which significantly affect the work effort corresponding to porting a software project across disparate platforms. The different phases associated with porting a software project can include, for example, configuring, compiling, linking, code changing, testing, bug fixing, and the like. Illustrative embodiments accurately predict the amount of work effort needed for porting software projects across disparate platforms based on feature data or metrics corresponding to the different phases associated with porting a software project using a plurality of trained machine learning models.

For example, illustrative embodiments retrieve historical porting work effort data corresponding to a number (e.g., less than 100) of previously ported software projects, extract a feature (e.g., a metric) for each respective phase of the plurality of different phases from the retrieved historical porting work effort data associated with the number of previously ported software projects, utilize curve fitting and machine learning models to determine an amount of work effort that each respective phase of the plurality of different phases contributes to a total work effort needed for porting a software project from one type of platform to a different heterogeneous type of platform. Then, illustrative embodiments utilize the amount of work effort that each respective phase of the plurality of phases contributes to porting the software project from one type of platform to a different type of platform to predict the total amount of work effort needed to port the software project between the disparate platform types.

Software project porting work effort is partially based on type of programming language and type of target platform. As a result, data used in training the machine learning models should correspond to the same type of programming language being ported to the same type of target platform. For example, the porting work effort needed for porting a C programming language project to a mainframe operating system platform is quite different from porting a GO programming language project to an open-source operating system platform. Even though a large amount of historical data associated with porting software projects in the same programming language to a same target platform is probably not readily available, illustrative embodiments are capable of utilizing only small amounts of historical data regarding porting software projects to train the plurality of machine learning models.

As used herein, the term phase means a particular step in porting a software project, as well as the data used in that particular phase. The phases include, for example, configuring, compiling, linking, code changing, testing, bug fixing, and the like. The configuring phase includes, for example, running code to identify the target environment (e.g., platform, operating system, hardware, software, and the like), tools (e.g., compiler, linker, and the like), dependencies (e.g., software dependencies, library dependencies, other software package dependencies, and the like), and options (e.g., runtime options, compiler options, linker options, and the like), and to generate commands (e.g., compile commands, linkage commands, and the like). The compiling phase includes, for example, running the compile commands in order for the compiler to transform source code of the software project into machine level instructions. The linking phase includes, for example, running the linkage commands in order for the linker to locate symbols in different objects and libraries, thus generating an executable program. The code changing phase includes, for example, modifying source code in one or more phases in order for the source code to run on the target platform. The testing phase includes, for example, verifying functionality of the program by running testcases prior to or during the software project being ported to the target platform. It should be noted that illustrative embodiments can generate new testcases during porting of the software project to the target platform. The bug fixing phase includes, for example, locating and identifying the cause of a testcase failure and then fixing the cause of the testcase failure (e.g., fixing a software bug using a software patch or update). If illustrative embodiments need to evaluate one or more other phases associated with porting a software project, then illustrative embodiments can evaluate one of these other phases based on resemblance to a particular phase of the plurality of phases.

Thus, illustrative embodiments provide one or more technical solutions that overcome a technical problem with an inability of current solutions to accurately predict the amount of work effort needed to port a software project from a source platform to a disparate platform. As a result, these one or more technical solutions provide a technical effect and practical application in the field of software project porting and machine learning model training.

With reference now to FIG. 2, a diagram illustrating an example of a porting work effort prediction system is depicted in accordance with an illustrative embodiment. Porting work effort prediction system 201 can be implemented in a computing environment, such as computing environment 100 in FIG. 1. Porting work effort prediction system 201 is a system of hardware and software components for accurately predicting the total work effort needed for porting a software project from a source platform to a disparate target platform using a plurality of machine learning models.

In this example, porting work effort prediction system 201 includes computer 202. Computer 202 can be, for example, computer 101 in FIG. 1. Computer 202 includes machine learning models 204. Machine learning models 204 can be implemented by porting work effort prediction code 200 in FIG. 1. Machine learning models 204 can be, for example, artificial neural networks, recurrent neural networks, and the like.

At 206, computer 202 retrieves previously ported software projects historical data in response to receiving a request to determine the amount of work effort needed to port a software project between disparate platforms. It should be noted that the software project can be any type of computer program. At 208, computer 202 extracts feature data corresponding to each respective phase of phases 210 from the previously ported software projects historical data. Phases 210 are associated with the steps for porting software projects. In this example, phases 210 include configuring phase 212, compiling phase 214, linking phase 216, code changing phase 218, testing phase 220, and bug fixing phase 222.

At 224, computer 202 trains machine learning models 204, which include machine learning model 1 226, machine learning model 2 228, machine learning model 3 230, machine learning model 4 232, machine learning model 5 234, and machine learning model 6 236, using the feature data corresponding to phases 210. For example, computer 202 trains machine learning model 1 226 to predict base porting work effort (E1) using feature data from configuring phases 212, compiling phase 214, linking phase 216, and code changing phase 218. Computer 202 trains machine learning model 2 228 to predict the new testcase number using feature data from configuring phases 212, compiling phase 214, linking phase 216, code changing phase 218, and testing phase 220, which includes the original number of testcases used.

Computer 202 trains machine learning model 3 230 to predict the testing effort (E2) using the predicted new testcase number feature data of testing phase 220. Computer 202 trains machine learning model 4 232 to predict the number of bugs using feature data from configuring phases 212, compiling phase 214, linking phase 216, code changing phase 218, and testing phase 220.

Computer 202 trains machine learning model 5 234 to predict the bug fixing effort (E3) using the predicted bug number feature data of bug fixing phase 222. Computer 202 trains machine learning model 6 239 to predict the total porting work effort (ET) using base porting work effort (E1), testing effort (E2), and bug fixing effort (E3). Computer 202 can port the software project from the source platform to the disparate target platform using trained machine learning models 226-236 when the total porting work effort (ET) is less than a defined maximum porting work effort threshold level.

With reference now to FIG. 3, a diagram illustrating an example of a machine learning training process is depicted in accordance with an illustrative embodiment. Machine learning training process 300 is implemented in a computer, such as, for example, computer 101 in FIG. 1 or computer 202 in FIG. 2.

In this example, machine learning training process 300 starts at 302 where the computer retrieves historical porting software projects data. At 304, the computer extracts feature data from the historical porting software projects data according to a plurality of phases, such as, for example, phases 210 in FIG. 2. At 306, the computer inputs the feature data into a plurality of machine learning models, such as, for example, machine learning models 204 in FIG. 2, as training data.

For example, at 308, the computer trains machine learning model 1 to predict base porting work effort (E1) using certain feature data corresponding to particular phases. At 310, the computer trains machine learning model 2 to predict a new testcase number using certain feature data corresponding to particular phases. At 312, the computer trains machine learning model 3 to predict testing effort (E2) using feature data corresponding to a particular phase. At 314, the computer trains machine learning model 4 to predict a bug number using certain feature data corresponding to particular phases. At 316, the computer trains machine learning model 5 to predict bug fixing effort (E3) using feature data corresponding to a particular phase. At 318, the computer trains machine learning model 6 to predict total porting work effort (ET) using base porting work effort (E1), testing effort (E2), and bug fixing effort (E3).

Figure 4:
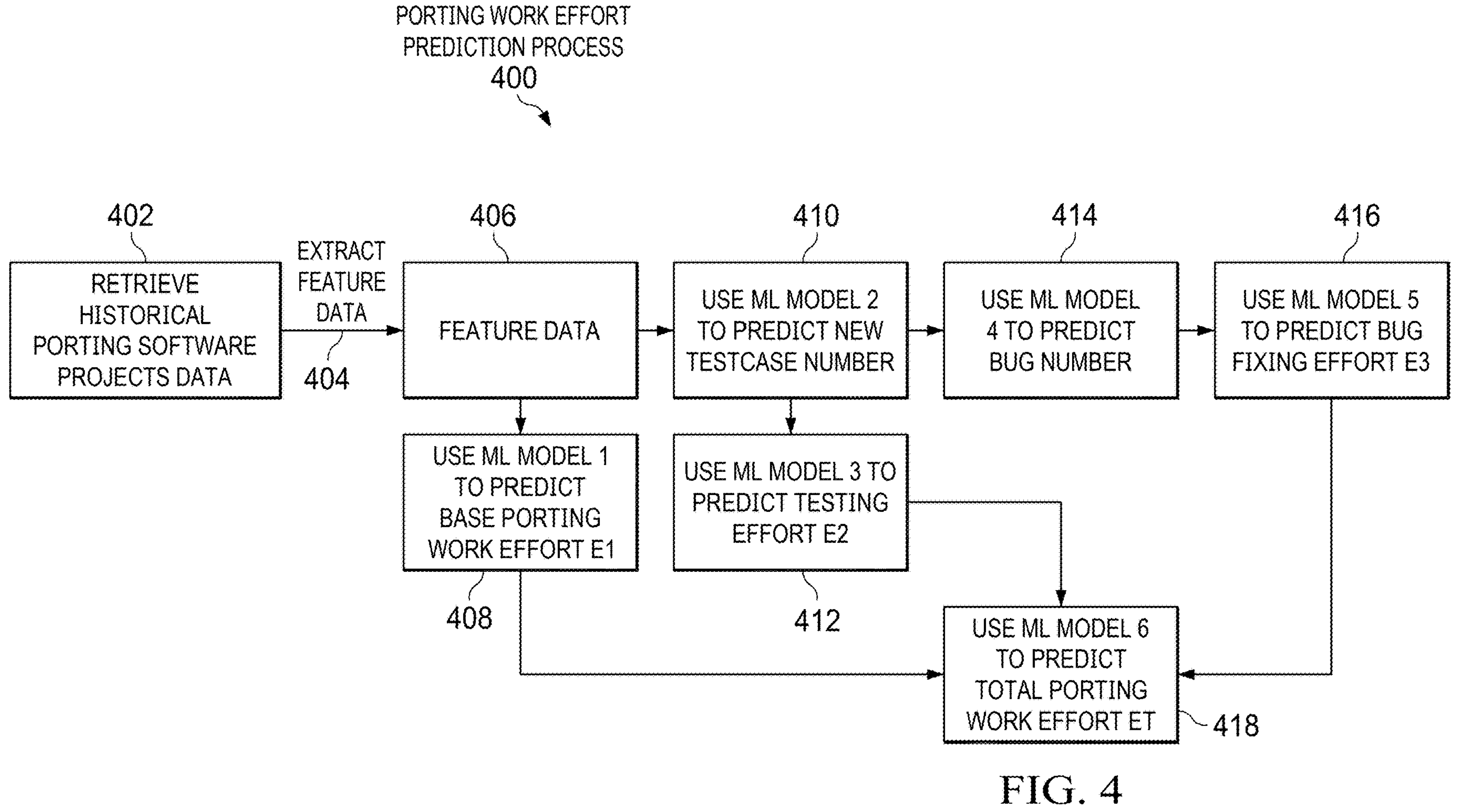
FIG. 4 is a diagram illustrating an example of a porting work effort prediction process in accordance with an illustrative embodiment.

With reference now to FIG. 4, a diagram illustrating an example of a porting work effort prediction process is depicted in accordance with an illustrative embodiment. Porting work effort prediction process 400 is implemented in a computer, such as, for example, computer 101 in FIG. 1 or computer 202 in FIG. 2.

In this example, porting work effort prediction process 400 starts at 402 where the computer retrieves historical porting software projects data. At 404, the computer extracts feature data 406 from the historical porting software projects data according to a plurality of phases, such as, for example, phases 210 in FIG. 2.

At 408, the computer uses machine learning model 1 to predict base porting work effort (E1) using certain portions of feature data 406 corresponding to particular phases. At 410, the computer uses machine learning model 2 to predict the new testcase number using certain portions of feature data 406 corresponding to particular phases. At 412, the computer uses machine learning model 3 to predict the testing effort (E2) using a certain portion of feature data 406 corresponding to a particular phase. At 414, the computer uses machine learning model 4 to predict the bug number using certain portions of feature data 406 corresponding to particular phases. At 416, the computer uses machine learning model 5 to predict the bug fixing effort (E3) using a certain portion of feature data 406 corresponding to a particular phase. At 418, the computer uses machine learning model 6 to predict the total porting work effort (ET) using the base porting work effort (E1), the testing effort (E2), and the bug fixing effort (E3).

With reference now to FIG. 5, a diagram illustrating an example of a porting work effort prediction table is depicted in accordance with an illustrative embodiment. Porting work effort prediction table 500 is implemented in a computer, such as, for example, computer 101 in FIG. 1 or computer 202 in FIG. 2, using, for example, porting work effort prediction code 200 in FIG. 1. In this example, porting work effort prediction table 500 includes phases 210, feature data 504, feature data index 506, porting work effort identifier 508, and example porting work effort number 510.

In response to the computer retrieving historical data corresponding to previously ported software projects, the computer classifies the historical data according to each of the different phases in phases 210. Phases 210 include configuring phase 212, compiling phase 214, linking phase 216, code changing phase 218, testing phase 220, and bug fixing phase 222. In addition, the computer retrieves historical work effort records corresponding to the previously ported software projects. The historical work effort records include, for example, the amount of time spent on each phase while building the software projects originally, type of programming language associated with each software project, type of platform each software project was originally build for, type of platform each software project was previously ported to, and the like.

Then, the computer identifies feature data 504 corresponding to each respective phase of phases 210 based on the classification of the historical data according to the different phases. For example, feature data 504 includes: configure code 512 (e.g., lines of configuration code in configuration files) corresponding to configuring phase 212; compile commands 514 (e.g., lines of code in make files) corresponding to compiling phase 214; linkage commands 516 (e.g., lines of code in header files) corresponding to linking phase 216; source code 518 (e.g., lines of code in source code files) corresponding to code changing phase 218; original testcase number 520 (e.g., number of testcases run while building the software project) corresponding to testing phase 220; new testcase number 522 (e.g., number of new testcases needed for porting the software project to a different type of platform) corresponding to testing phase 220; and bug number 524 (e.g., number of bugs predicted to be found while running the number of new testcases) corresponding to bug fixing phase 222. However, if feature data is not available for a particular phase, then the computer can use zero filling for the feature data corresponding to that particular phase.

Figure 6:
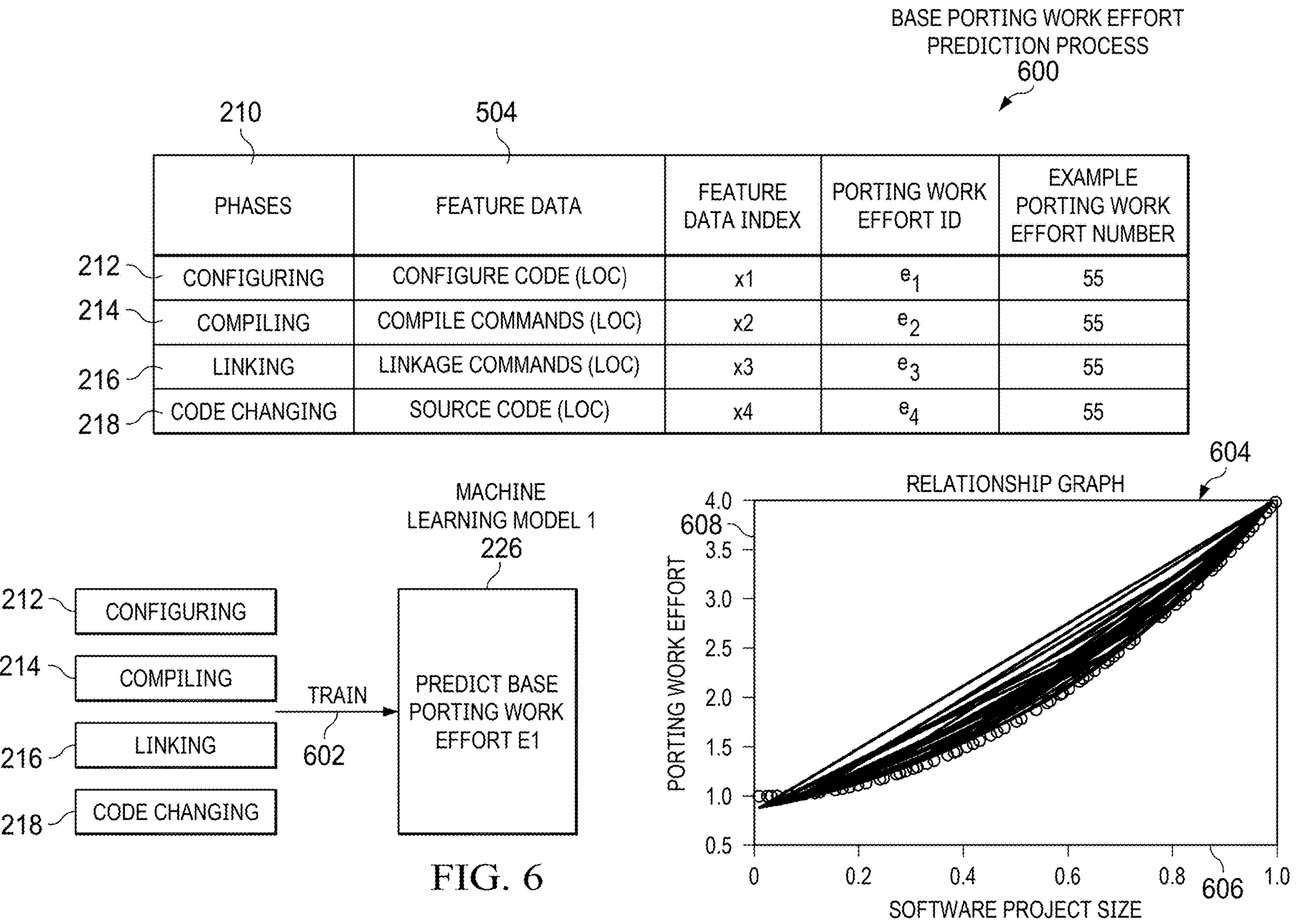
FIG. 6 is a diagram illustrating an example of a base porting work effort prediction process in accordance with an illustrative embodiment.

With reference now to FIG. 6, a diagram illustrating an example of a base porting work effort prediction process is depicted in accordance with an illustrative embodiment. Base porting work effort prediction process 600 is implemented in a computer, such as, for example, computer 101 in FIG. 1 or computer 202 in FIG. 2, using, for example, porting work effort prediction code 200 in FIG. 1.

At 602, the computer trains machine learning model 1 226 to predict base porting work effort (E1). Based on the group of phases comprising configuring phase 212 (feature data index x1), compiling phase 214 (feature data index x2), linking phase 216 (feature data index x3), and code changes phase 218 (feature data index x4), the computer determines the prediction function: E1=f(x1, x2, x3, x4), where E1 is the predicted base porting work effort corresponding to the above group of phases. By examining the historical data corresponding to previously ported software projects, the computer has learned that software project size and porting work effort has a linear or nearly linear relationship as shown in relationship graph 604. Relationship graph 604 includes software project size 606 as the x-axis and porting work effort 608 as the y-axis with the curves indicating the relationship between software project size and porting work effort.

Based on relationship graph 604, the computer utilizes a best fitting curve to predict the base porting work effort (E1) corresponding to the above group of phases. It should be noted that the computer can utilize any existing curve fitting method to find the best fitting curve.

Figure 7:
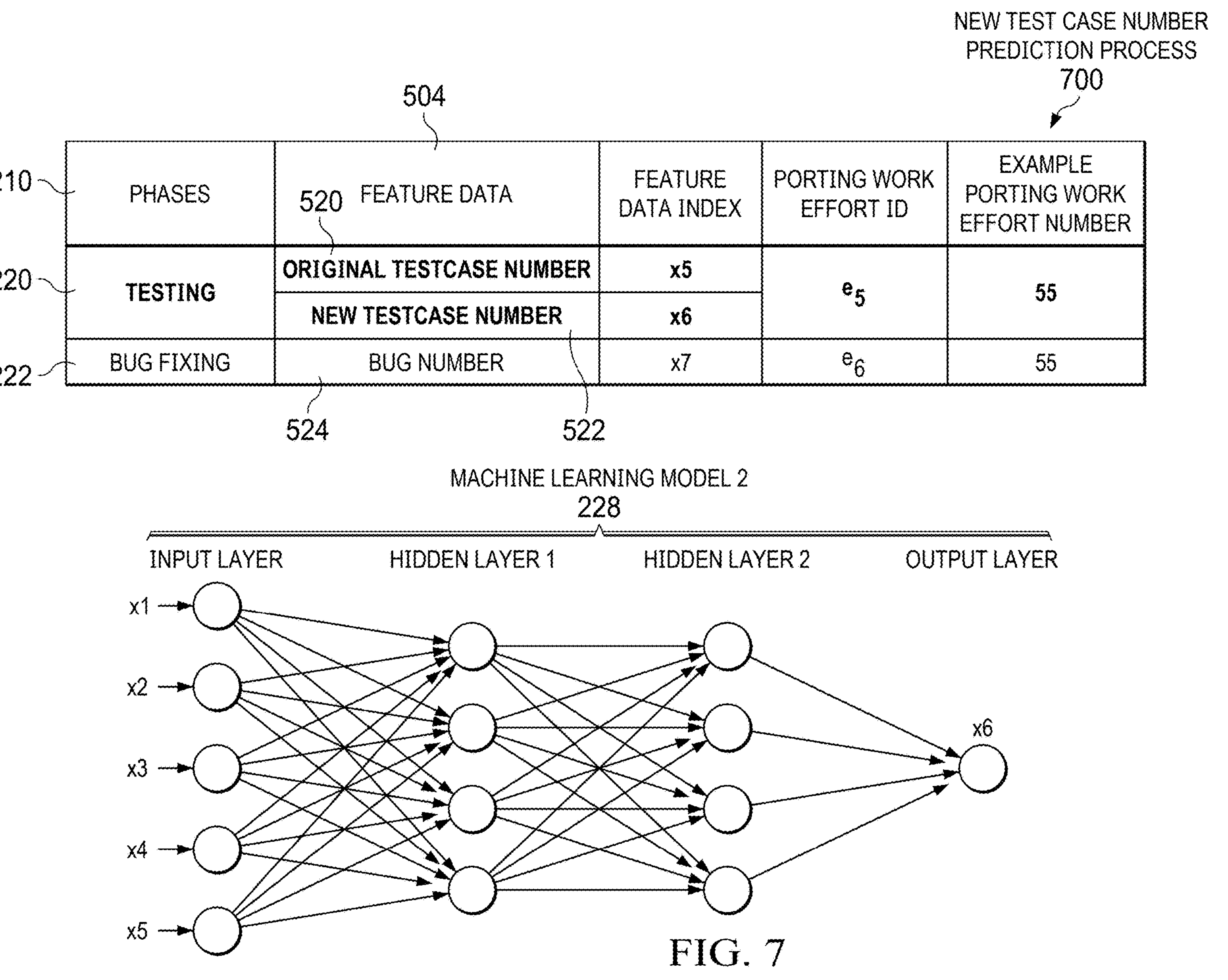
FIG. 7 is a diagram illustrating an example of a new testcase number prediction process in accordance with an illustrative embodiment.

With reference now to FIG. 7, a diagram illustrating an example of a new testcase number prediction process is depicted in accordance with an illustrative embodiment. New testcase number prediction process 700 is implemented in a computer, such as, for example, computer 101 in FIG. 1 or computer 202 in FIG. 2, using, for example, porting work effort prediction code 200 in FIG. 1.

The computer trains machine learning model 2 228 to predict the number of new testcases needed based on original testcase number 520 of testing phase 220 (feature data index x5), along with feature data corresponding to the configuring phase (feature data index x1), the compiling phase (feature data index x2), the linking phase (feature data index x3), and the code changing phase (feature data index x4). Thus, the computer determines the new testcase number prediction function: x6=f(x1, x2, x3, x4, x5), where x6 is the predicted number of new testcases needed for porting the software project to the disparate target platform. As a result, the computer utilizes trained machine learning model 2 228 to predict the number of new testcases needed (feature data index x6) using feature data 504 corresponding to the group of phases including configuring (x1), compiling (x2), linking (x3), code changing (x4), and testing (x5) (i.e., original number of testcases used).

Afterward, the computer trains machine learning model 3 based on original testcase number 520 (x5) (i.e., the original number of testcases used) and new testcase number 522 (x6) (i.e., the predicted number of new testcases needed). Thus, trained machine learning model 3 can predict the second porting work effort (E2) corresponding to testing phase 220 using the prediction function: E2=f(x5+x6), where x5 is original testcase number 520 and x6 is predicted new testcase number 522. It should be noted that the computer can utilize any existing method to find the best prediction function.

Figure 8:
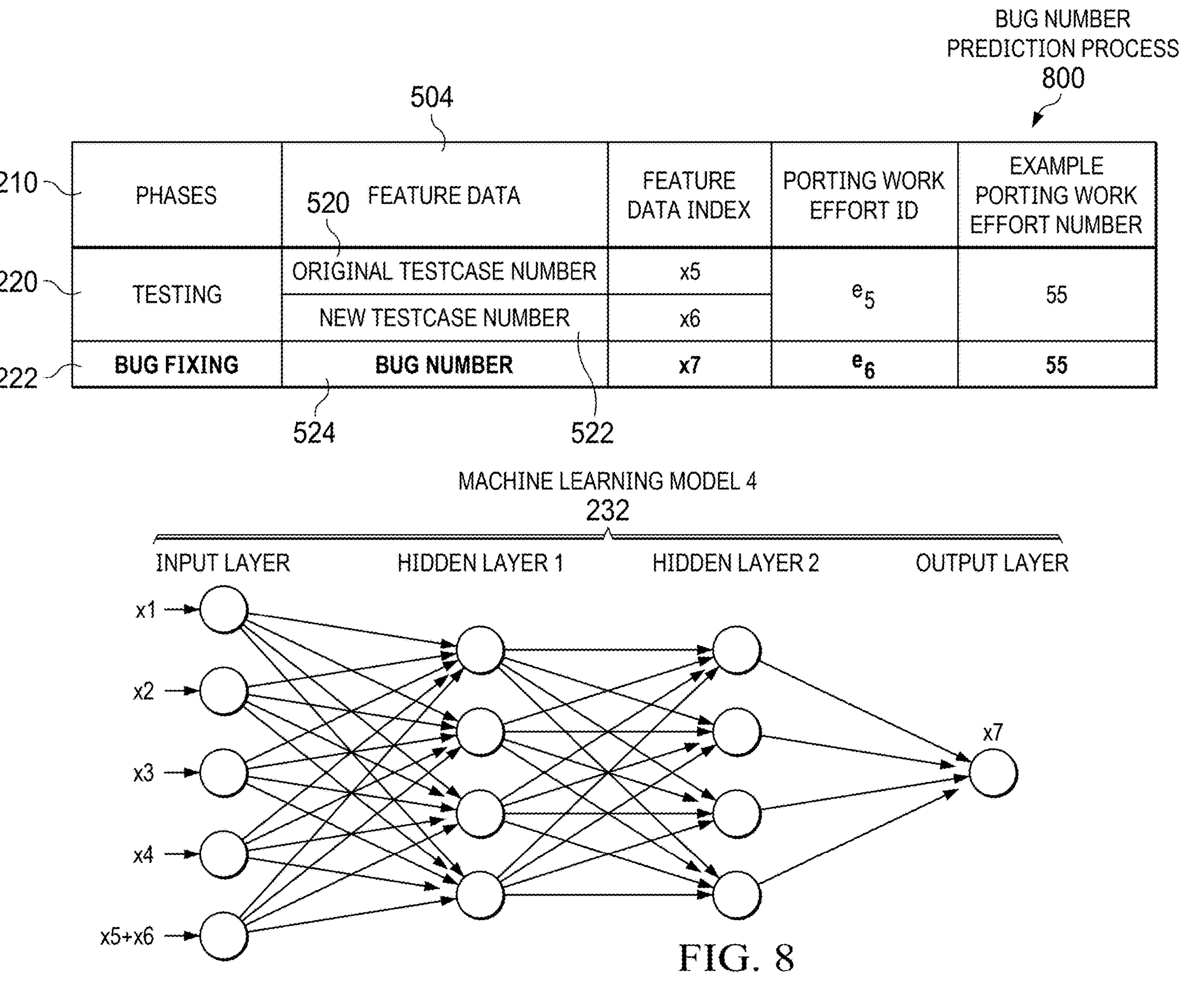
FIG. 8 is a diagram illustrating an example of a bug number prediction process in accordance with an illustrative embodiment.

With reference now to FIG. 8, a diagram illustrating an example of a bug number prediction process is depicted in accordance with an illustrative embodiment. Bug number prediction process 800 is implemented in a computer, such as, for example, computer 101 in FIG. 1 or computer 202 in FIG. 2, using, for example, porting work effort prediction code 200 in FIG. 1.

The computer trains machine learning model 4 232 to predict the number of bugs detected while running testcases based on the feature data corresponding to the group of phases comprising the configuring phase (x1), the compiling phase (x2), the linking phase (x3), and the code changes phase (x4), along with the original number of testcases used (x5) and the predicted number of new testcases needed (x6). Thus, the computer determines the prediction function: x7=f(x1, x2, x3, x4, (x5+x6)), where x7 is the predicted number of bugs that will be detected while running testcases during porting. As a result, the computer utilizes trained machine learning model 4 232 to predict bug number 524 (x7) (i.e., the number of bugs detected) using the feature data corresponding to the group of phases including configuring (x1), compiling (x2), linking (x3), and code changing (x4), along with the original number of testcases used (x5) plus the predicted number of new testcases needed (x6).

Afterward, the computer trains machine learning model 5 based on bug number 524 (x7) (i.e., the predicted number of bugs detected). Thus, trained machine learning model 5 can predict the third porting work effort (E3) corresponding to the amount of effort to fix detected bugs using the prediction function: E3=f(x7), where x7 is the number of bugs predicted. It should be noted that the computer can utilize any existing method to find the best prediction function.

Figure 9:
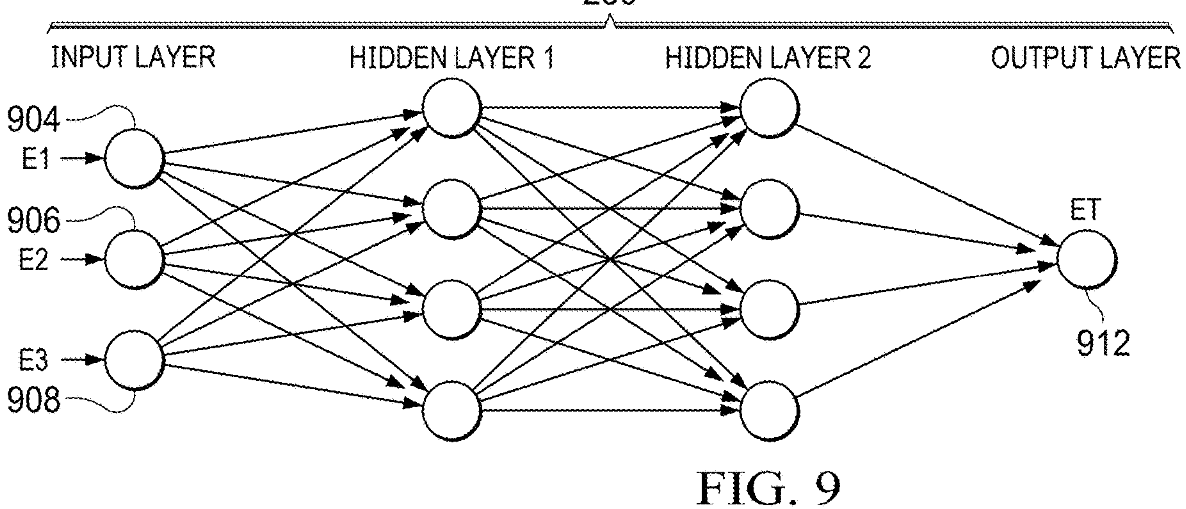
FIG. 9 is a diagram illustrating an example of a total porting work effort prediction process in accordance with an illustrative embodiment.

With reference now to FIG. 9, a diagram illustrating an example of a total porting work effort prediction process is depicted in accordance with an illustrative embodiment. Total porting work effort prediction process 900 is implemented in a computer, such as, for example, computer 101 in FIG. 1 or computer 202 in FIG. 2, using, for example, porting work effort prediction code 200 in FIG. 1.

In response to the computer predicting the first porting work effort (i.e., the base porting work effort) (E1 904), the second porting work effort (i.e., the testing work effort) (E2 906), and the third porting work effort (i.e., the bug fixing work effort) (E3 908) using the machine learning model 1, machine learning model 2, machine learning model 3, machine learning model 4, and machine learning model 5, the computer utilizes the first porting work effort (E1 904), the second porting work effort (E2 906), and the third porting work effort (E3 908) to train machine learning model 6 236 to predict the total porting work effort (ET 912) needed to port the software project to a disparate target platform.

Thus, the computer determines the total porting work effort prediction function: ET=f(E1, E2, E3), where ET is the predicted total porting work effort for porting the software project to a disparate target platform. It should be noted that the total porting work effort (ET 912) can be a weighted value. The computer can utilize, for example, a neural network to determine and apply a weight to each of E1 904, E2 906, and E3 908. The computer utilize machine learning to predict the total porting work effort (ET 912) instead of simply summing E1 904, E2 906, and E3 908 because porting can also include other phases, such as, for example, design, document, build, review, and the like, which are relatively minor and some historical work effort records used as training data for one or more machine learning models may be not very precise.

With reference now to FIGS. 10A-10C, a flowchart illustrating a process for predicting porting work effort is shown in accordance with an illustrative embodiment. The process shown in FIGS. 10A-10C may be implemented in a computer, such as, for example, computer 101 in FIG. 1 or computer 202 in FIG. 2. For example, the process shown in FIGS. 10A-10C may be implemented by porting work effort prediction code 200 in FIG. 1.

The process begins when the computer receives a request to port a software project from a source platform to a disparate target platform (step 1002). The computer retrieves a set of historical data corresponding to similar software projects previously ported to similar target platforms from a database in response to the request (step 1004).

The computer performs an analysis of the set of historical data corresponding to the similar software projects previously ported to the similar target platforms (step 1006). The computer extracts feature data for each respective phase of a plurality of phases associated with a software project porting process from the set of historical data based on the analysis of the set of historical data corresponding to the similar software projects previously ported to the similar target platforms (step 1008). The plurality of phases includes a configuring phase, a compiling phase, a linking phase, a code changing phase, a testing phase, and a bug fixing phase.

The computer trains a first machine learning model to predict a first porting work effort (E1) using the feature data corresponding to the configuring phase, the compiling phase, the linking phase, and the code changing phase (step 1010). The computer trains a second machine learning model to predict a number of new testcases needed using the feature data corresponding to the configuring phase, the compiling phase, the linking phase, the code changing phase, and the testing phase that includes a number of original testcases used while building the software project originally (step 1012).

The computer trains a third machine learning model to predict a second porting work effort (E2) using the predicted number of new testcases needed that is included in the feature data corresponding to the testing phase (step 1014). The computer trains a fourth machine learning model to predict a number of bugs detected while running the number of original testcases and the predicted number of new testcases needed using the feature data corresponding to the configuring phase, the compiling phase, the linking phase, the code changing phase, and the testing phase (step 1016).

The computer trains a fifth machine learning model to predict a third porting work effort (E3) using the predicted number of bugs detected that is included in the feature data corresponding to the bug fixing phase (step 1018). The computer trains a sixth machine learning model to predict a total porting work effort (ET) using the first porting work effort (E1), the second porting work effort (E2), and the third porting work effort (E3) (step 1020).

The computer utilizes the first machine learning model to predict the first porting work effort (E1) using the feature data corresponding to the configuring phase, the compiling phase, the linking phase, and the code changing phase (step 1022). The computer utilizes the second machine learning model to predict the number of new testcases needed using the feature data corresponding to the configuring phase, the compiling phase, the linking phase, the code changing phase, and the testing phase that includes the number of original testcases used while building the software project originally (step 1024).

The computer utilizes the third machine learning model to predict the second porting work effort (E2) using the predicted number of new testcases needed that is included in the feature data corresponding to the testing phase (step 1026). The computer utilizes the fourth machine learning model to predict the number of bugs detected while running the number of original testcases and the predicted number of new testcases needed using the feature data corresponding to the configuring phase, the compiling phase, the linking phase, the code changing phase, and the testing phase (step 1028).

The computer utilizes the fifth machine learning model to predict the third porting work effort (E3) using the predicted number of bugs detected that is included in the feature data corresponding to the bug fixing phase (step 1030). The computer utilizes the sixth machine learning model to predict the total porting work effort (ET) needed to port the software project from the source platform to the disparate target platform using the first porting work effort (E1), the second porting work effort (E2), and the third porting work effort (E3) (step 1032). The first porting work effort (E1) is a base porting work effort, the second porting work effort (E2) is a testing effort, and the third porting work effort (E3) is a bug fixing effort. The computer ports the software project from the source platform to the disparate target platform based on the total porting work effort being less than a defined maximum porting work effort threshold level (step 1034). Thereafter, the process terminates.

Thus, illustrative embodiments of the present disclosure provide a computer-implemented method, computer system, and computer program product for predicting porting work effort. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for machine learning model training and software project porting from a source platform to a disparate target platform based on total porting work effort, the computer-implemented method comprising:

training, by a computer, a first machine learning model to predict a first porting work effort using feature data extracted from a set of historical porting software projects data corresponding to a configuring phase, a compiling phase, a linking phase, and a code changing phase, a second machine learning model to predict a number of new testcases needed to port the software project to the disparate target platform using the feature data extracted from the set of historical porting software projects data corresponding to the configuring phase, the compiling phase, the linking phase, the code changing phase, and a testing phase that includes a number of original testcases used while building a software project, a third machine learning model to predict a second porting work effort using the number of new testcases that is included in the feature data extracted from the set of historical porting software projects data corresponding to the testing phase, a fourth machine learning model to predict a number of bugs detected while running the number of original testcases and the number of new testcases using the feature data extracted from the set of historical porting software projects data corresponding to the configuring phase, the compiling phase, the linking phase, the code changing phase, and the testing phase, a fifth machine learning model to predict a third porting work effort using the number of bugs detected that is included in the feature data extracted from the set of historical porting software projects data corresponding to a bug fixing phase, and a sixth machine learning model to predict the total porting work effort using the first porting work effort input by the first machine learning model, the second porting work effort input by the third machine learning model, and the third porting work effort input by the fifth machine learning model into the sixth machine learning model, wherein:

the compiling phase runs compile commands for a compiler to transform source code of the software project into machine level instructions, the linking phase runs linkage commands for a linker to locate symbols in different objects and libraries to generate an executable software project, the code changing phase modifies the source code of the software project in one or more phases for the source code to run on the disparate target platform, the testing phase runs testcases prior to and during porting of the software project from the source platform to the disparate target platform to verify functionality of the software project on the disparate target platform, and the bug fixing phase fixes software bugs that cause vulnerabilities in the software project detected by testcase failures to increase security of the software project during the porting of the software project from the source platform to the disparate target platform;

and porting, by the computer, the software project from the source platform to the disparate target platform based on the total porting work effort being less than a defined maximum porting work effort threshold level in response to the sixth machine learning model predicting the total porting work effort to port the software project from the source platform to the disparate target platform based on the first porting work effort input by the first machine learning model, the second porting work effort input by the third machine learning model, and the third porting work effort input by the fifth machine learning model into the sixth machine learning model, wherein the computer increases the security of the software project during the porting of the software project from the source platform to the disparate target platform by fixing the software bugs that cause the vulnerabilities in the software project in the bug fixing phase.

2. The computer-implemented method of claim 1, further comprising:

predicting, by the computer, utilizing the first machine learning model, the first porting work effort using the feature data corresponding to the configuring phase, the compiling phase, the linking phase, and the code changing phase.

3. The computer-implemented method of claim 1, further comprising:

predicting, by the computer, utilizing the second machine learning model, the number of new testcases using the feature data corresponding to the configuring phase, the compiling phase, the linking phase, the code changing phase, and the testing phase that includes the number of original testcases used while building the software project; and predicting, by the computer, utilizing the third machine learning model, the second porting work effort using a predicted number of new testcases that is included in the feature data corresponding to the testing phase.

4. The computer-implemented method of claim 1, further comprising:

predicting, by the computer, utilizing the fourth machine learning model, the number of bugs detected while running the number of original testcases and a predicted number of new testcases using the feature data corresponding to the configuring phase, the compiling phase, the linking phase, the code changing phase, and the testing phase; and predicting, by the computer, utilizing the fifth machine learning model, the third porting work effort using a predicted number of bugs detected that is included in the feature data corresponding to the bug fixing phase.

5. The computer-implemented method of claim 1, wherein the first porting work effort is a base porting work effort, the second porting work effort is a testing effort, and the third porting work effort is a bug fixing effort.

6. The computer-implemented method of claim 1, further comprising:

receiving, by the computer, a request to port the software project from the source platform to the disparate target platform;

retrieving, by the computer, a set of historical data corresponding to similar software projects previously ported to similar target platforms in response to the request;

performing, by the computer, an analysis of the set of historical data corresponding to the similar software projects previously ported to the similar target platforms; and extracting, by the computer, the feature data for each respective phase of a plurality of phases associated with a software project porting process from the set of historical data based on the analysis of the set of historical data corresponding to the similar software projects previously ported to the similar target platforms, wherein the plurality of phases includes the configuring phase, the compiling phase, the linking phase, the code changing phase, the testing phase, and the bug fixing phase.

7. A computer system for machine learning model training and software project porting from a source platform to a disparate target platform based on total porting work effort, the computer system comprising:

a communication fabric;

a set of computer-readable storage media connected to the communication fabric, wherein the set of computer-readable storage media collectively stores program instructions; and a set of processors connected to the communication fabric, wherein the set of processors executes the program instructions to:

train a first machine learning model to predict a first porting work effort using feature data extracted from a set of historical porting software projects data corresponding to a configuring phase, a compiling phase, a linking phase, and a code changing phase, a second machine learning model to predict a number of new testcases needed to port the software project to the disparate target platform using the feature data extracted from the set of historical porting software projects data corresponding to the configuring phase, the compiling phase, the linking phase, the code changing phase, and a testing phase that includes a number of original testcases used while building a software project, a third machine learning model to predict a second porting work effort using the number of new testcases that is included in the feature data extracted from the set of historical porting software projects data corresponding to the testing phase, a fourth machine learning model to predict a number of bugs detected while running the number of original testcases and the number of new testcases using the feature data extracted from the set of historical porting software projects data corresponding to the configuring phase, the compiling phase, the linking phase, the code changing phase, and the testing phase, a fifth machine learning model to predict a third porting work effort using the number of bugs detected that is included in the feature data extracted from the set of historical porting software projects data corresponding to a bug fixing phase, and a sixth machine learning model to predict the total porting work effort using the first porting work effort input by the first machine learning model, the second porting work effort input by the third machine learning model, and the third porting work effort input by the fifth machine learning model into the sixth machine learning model, wherein:

the compiling phase runs compile commands for a compiler to transform source code of the software project into machine level instructions, the linking phase runs linkage commands for a linker to locate symbols in different objects and libraries to generate an executable software project, the code changing phase modifies the source code of the software project in one or more phases for the source code to run on the disparate target platform, the testing phase runs testcases prior to and during porting of the software project from the source platform to the disparate target platform to verify functionality of the software project on the disparate target platform, and the bug fixing phase fixes software bugs that cause vulnerabilities in the software project detected by testcase failures to increase security of the software project during the porting of the software project from the source platform to the disparate target platform;

and port the software project from the source platform to the disparate target platform based on the total porting work effort being less than a defined maximum porting work effort threshold level in response to the sixth machine learning model predicting the total porting work effort to port the software project from the source platform to the disparate target platform based on the first porting work effort input by the first machine learning model, the second porting work effort input by the third machine learning model, and the third porting work effort input by the fifth machine learning model into the sixth machine learning model, wherein the security of the software project is increased during porting of the software project from the source platform to the disparate target platform by fixing the software bugs that cause the vulnerabilities in the software project in the bug fixing phase.

8. The computer system of claim 7, wherein the set of processors further executes the program instructions to:

predict, utilizing the first machine learning model, the first porting work effort using the feature data corresponding to the configuring phase, the compiling phase, the linking phase, and the code changing phase.

9. The computer system of claim 7, wherein the set of processors further executes the program instructions to:

predict, utilizing the second machine learning model, the number of new testcases using the feature data corresponding to the configuring phase, the compiling phase, the linking phase, the code changing phase, and the testing phase that includes the number of original testcases used while building the software project; and predict, utilizing the third machine learning model, the second porting work effort using a predicted number of new testcases that is included in the feature data corresponding to the testing phase.

10. The computer system of claim 7, wherein the set of processors further executes the program instructions to:

predict, utilizing the fourth machine learning model, the number of bugs detected while running the number of original testcases and a predicted number of new testcases using the feature data corresponding to the configuring phase, the compiling phase, the linking phase, the code changing phase, and the testing phase; and predict, utilizing the fifth machine learning model, the third porting work effort using a predicted number of bugs detected that is included in the feature data corresponding to the bug fixing phase.

11. The computer system of claim 7, wherein the first porting work effort is a base porting work effort, the second porting work effort is a testing effort, and the third porting work effort is a bug fixing effort.

12. A computer program product for machine learning model training and software project porting from a source platform to a disparate target platform based on total porting work effort, the computer program product comprising a set of computer-readable storage media having program instructions collectively stored therein, the program instructions executable by a computer to cause the computer to:

train a first machine learning model to predict a first porting work effort using feature data extracted from a set of historical porting software projects data corresponding to a configuring phase, a compiling phase, a linking phase, and a code changing phase, a second machine learning model to predict a number of new testcases needed to port the software project to the disparate target platform using the feature data extracted from the set of historical porting software projects data corresponding to the configuring phase, the compiling phase, the linking phase, the code changing phase, and a testing phase that includes a number of original testcases used while building a software project, a third machine learning model to predict a second porting work effort using the number of new testcases that is included in the feature data extracted from the set of historical porting software projects data corresponding to the testing phase, a fourth machine learning model to predict a number of bugs detected while running the number of original testcases and the number of new testcases using the feature data extracted from the set of historical porting software projects data corresponding to the configuring phase, the compiling phase, the linking phase, the code changing phase, and the testing phase, a fifth machine learning model to predict a third porting work effort using the number of bugs detected that is included in the feature data extracted from the set of historical porting software projects data corresponding to a bug fixing phase, and a sixth machine learning model to predict the total porting work effort using the first porting work effort input by the first machine learning model, the second porting work effort input by the third machine learning model, and the third porting work effort input by the fifth machine learning model into the sixth machine learning model, wherein:

the compiling phase runs compile commands for a compiler to transform source code of the software project into machine level instructions, the linking phase runs linkage commands for a linker to locate symbols in different objects and libraries to generate an executable software project, the code changing phase modifies the source code of the software project in one or more phases for the source code to run on the disparate target platform, the testing phase runs testcases prior to and during porting of the software project from the source platform to the disparate target platform to verify functionality of the software project on the disparate target platform, and the bug fixing phase fixes software bugs that cause vulnerabilities in the software project detected by testcase failures to increase security of the software project during the porting of the software project from the source platform to the disparate target platform;

and port the software project from the source platform to the disparate target platform based on the total porting work effort being less than a defined maximum porting work effort threshold level in response to the sixth machine learning model predicting the total porting work effort to port the software project from the source platform to the disparate target platform based on the first porting work effort input by the first machine learning model, the second porting work effort input by the third machine learning model, and the third porting work effort input by the fifth machine learning model into the sixth machine learning model, wherein the security of the software project is increased during porting of the software project from the source platform to the disparate target platform by fixing the software bugs that cause the vulnerabilities in the software project in the bug fixing phase.

13. The computer program product of claim 12, wherein the program instructions further cause the computer to:

predict, utilizing the first machine learning model, the first porting work effort using the feature data corresponding to the configuring phase, the compiling phase, the linking phase, and the code changing phase.

14. The computer program product of claim 12, wherein the program instructions further cause the computer to:

predict, utilizing the second machine learning model, the number of new testcases using the feature data corresponding to the configuring phase, the compiling phase, the linking phase, the code changing phase, and the testing phase that includes the number of original testcases used while building the software project; and predict, utilizing the third machine learning model, the second porting work effort using a predicted number of new testcases that is included in the feature data corresponding to the testing phase.

15. The computer program product of claim 12, wherein the program instructions further cause the computer to:

predict, utilizing the fourth machine learning model, the number of bugs detected while running the number of original testcases and a predicted number of new testcases using the feature data corresponding to the configuring phase, the compiling phase, the linking phase, the code changing phase, and the testing phase; and predict, utilizing the fifth machine learning model, the third porting work effort using a predicted number of bugs detected that is included in the feature data corresponding to the bug fixing phase.

16. The computer program product of claim 12, wherein the first porting work effort is a base porting work effort, the second porting work effort is a testing effort, and the third porting work effort is a bug fixing effort.

* * * * *